United States Patent [19]

Miller

[11] Patent Number: 4,919,459
[45] Date of Patent: Apr. 24, 1990

[54] METAL-TO-METAL BACKSEAT LOCKDOWN SCREW

[75] Inventor: James O. Miller, Tomball, Tex.

[73] Assignee: Cooper Industries, Inc., Houston, Tex.

[21] Appl. No.: 389,181

[22] Filed: Aug. 3, 1989

[51] Int. Cl.$^5$ .............................................. E21B 19/10
[52] U.S. Cl. ..................................... 285/140; 285/351; 285/917; 403/362
[58] Field of Search ................. 403/362; 285/140, 142, 285/143, 144, 145, 146, 147, 148, 351, 917

[56] References Cited

U.S. PATENT DOCUMENTS

| | | | |
|---|---|---|---|
| 2,532,662 | 12/1950 | Eckel et al. | 285/147 |
| 3,132,880 | 5/1964 | Jones | 285/142 |
| 4,190,270 | 2/1980 | Vanderford | 285/917 X |
| 4,455,040 | 6/1984 | Shinn | 285/917 X |

Primary Examiner—Andrew V. Kundrat
Attorney, Agent, or Firm—William E. Shull; Ned L. Conley; David A. Rose

[57] ABSTRACT

A lockdown screw having a gland nut threaded into a radially extending bore in a head. The radial bore is threaded only so far as to accommodate the gland nut. A stem is threaded into the gland nut for reciprocation into or out of the main bore of the head. The threads on the stem and in the gland nut are the sole working threads of the lockdown screw. A self-energizing packing is disposed around the stem for sealing between the stem and the radial bore. There is zero extrusion gap between the gland nut and the radial bore, adjacent and outwardly of the packing. A step shoulder on the stem carries the packing with it when the stem is removed from the head. An annular backseat shoulder on the stem is engageable with an annular backseat in the gland nut, forming a metal-to-metal seal, in the event of a leak. In the event that the leak is not stopped by actuation of the backseat seal, additional metal-to-metal seals are actuated between the gland nut and the stem, and between the gland nut and the head at the inner and outer ends of the gland nut, by torquing down on the gland nut.

15 Claims, 1 Drawing Sheet

METAL-TO-METAL BACKSEAT LOCKDOWN SCREW

BACKGROUND OF THE INVENTION

The present invention relates generally to apparatus useful in locking or holding down one member within another member, and/or in actuating a seal member or other mechanism associated with the members. The present invention is particularly useful in connection with the production of oil and gas, in the form of a lockdown screw which may be used in a wellhead housing, a casing or tubing head, a spool, or another such member to hold down a casing hanger, tubing hanger, or other apparatus therewithin, to actuate a seal member between the hanger or other apparatus and the member within which it is disposed, or for other purposes.

In the production of oil and gas, it is common practice to use lockdown screws in wellhead housings, casing or tubing heads, spools, or the like to hold down casing or tubing hangers or other equipment therewithin. Such lockdown screws are also commonly used to energize or actuate seal members or other mechanisms disposed between the hangers or other equipment and the housings or heads for establishing a fluid-tight seal between the members, or for accomplishing some other purpose. Typically, lockdown screws used in the past have included a gland nut threaded into a first bore in the housing or head, a stem threaded into a second, reduced diameter bore in the housing or head, the second bore typically being coaxial with the first bore, for longitudinal movement into or out of the housing or head upon clockwise or counterclockwise rotation, as the case may be, of the stem in the second bore, and a packing between the stem and the housing or head, actuated by tightening the gland nut, for sealing between the stem and the housing or head. Thus, lockdown screws used in the past have typically had two threads in the housing or head, the first being that in which the gland nut operates and the second being that in which the stem operates. The latter thread is typically referred to as the working thread. Both threads are usually placed in a flange or the like in the housing or head. For large flanges, the threads of the second bore are thus disposed at relatively large distances from their outside surfaces.

From time to time, leaks may develop in the stem packing, permitting the escape of fluids from the housing or head at the location of the leaking lockdown screw. Such leaks may be extremely dangerous for an oil or gas well containing highly flammable and volatile petroleum products, which are usually under high pressure, possibly resulting in a fire, explosion, or other hazardous situation. In an extreme case, the eventual result could even be a blowout.

Sometimes a lockdown screw leak can be corrected by simply tightening the gland nut, increasing the energizing force on the packing material and forcing the packing material more tightly against the housing and the stem. At other times, however, such a procedure may not be sufficient to stop the leak, or may not be appropriate even if the leak were to be stopped. For example, the gland nut may already be tightened to an extent such that it cannot easily be tightened further, or if tightened further it might cause damage to the threads on the gland nut or in its threaded bore. Damage to the threads in the first bore or on the gland nut might in turn exacerbate the leak. Thread damage in the first bore may require costly and time-consuming repair, as discussed further below. Moreover, in a situation where one or several lockdown screws of a greater plurality of such screws is or are tightened to varying degrees in order to stop leaks, the load applied by such screws to a compression packoff or the like becomes uneven or uncertain, possibly resulting in improper packoff performance, or even damage to the packoff.

Thread damage in the second threaded bore also occurs from time to time and is particularly troublesome, since in most cases the threads in the second bore will extend from the end of the first threaded bore along the entire remaining length of the bore, deep into the housing or head as referred to above, and it is not always easy or convenient to repair damaged threads of this type. Such repair usually requires plugging, welding, and reboring the damaged bore, or boring an entirely new threaded bore adjacent to the plugged bore. The same can be said of damage to the threads in the first bore. It may be difficult to make such repairs in the field; a trip to the shop may be required. Damage to the working threads, i.e., those in the stem bore, can occur, for example, if the stem were to be cross-threaded or overtorqued, if the stem were to be dropped or otherwise mishandled, or for other reasons. Moreover, since the working threads are usually exposed to mud, oil, dirt and other contaminants from well fluids, because the stem packing is typically disposed radially outwardly of the working threads, the risk of damage to such threads is greatly enhanced.

If the operators are unable to stop the leaking lockdown screw by simply tightening the gland nut, usually the well will have to be shut in and production or other operations stopped, or a special packer will have to be run into the well to isolate the wellbore from the leaking lockdown screw, in order to correct the problem. It may be that simply replacing the packing or the entire lockdown screw will stop the leak, but if there is any significant damage to the threads in the stem bore or the gland nut bore, then repairs of the type referred to above may be necessary. In addition, frequently the stem packings become stuck in their bores, making it difficult to remove them and unduly complicating the packing replacement operation. Downtime for high-priced rig crews and equipment while waiting for repairs to be made can be prohibitively expensive, especially if off-site repair is required.

In addition to the problems discussed above, there is a serious problem with prior art lockdown screw designs that allows operator error to create potentially hazardous, even catastrophic, conditions at the well site. In the past, in order to run a lockdown screw when desired or required by well operations (typically when the hanger is landed or otherwise packed off with the lockdown screw), frequently the gland nut is or must be loosened to allow the lockdown screw stem to be rotated easily. This in turn de-energizes the packing around the lockdown screw stem. If the operator then forgets to re-tighten the gland nut when the lockdown screw is placed in service and the well is opened or the packoff isolating the lockdown screw removed, a leak is likely to occur at the subject gland nut, possibly leading to a fire, explosion, or blowout as discussed above. Since there are typically many such lockdown screws to be alternately placed into and taken out of service in a conventional wellhead installation, the probability of an operator's forgetting or neglecting to re-tighten all of the gland nuts once they have been loosened is substantial.

It is an object of the present invention to provide a lockdown screw for use with a wellhead housing, casing head or tubing head, spool, or other such member which overcomes the problems of prior art lockdown screws referred to above. It is another object of the present invention to provide such a lockdown screw which has a self-energized packing which does not require the gland nut to be screwed tightly into its receiving bore in order to actuate the packing, minimizing the possibility of damage to the threads in the bore and on the gland nut. It is yet another object of the present invention to provide such a lockdown screw with a self-energized packing wherein the working thread is adapted for stem actuation only and is placed in the gland nut instead of the flange of the housing or head, resulting in both easier manufacture of the housing or head and easier repairs to damaged or leaking lockdown screws in the event such repairs are necessary. It is also an object of the present invention to provide such a lockdown screw which has a metal-to-metal backseat seal which may be quickly and easily actuated in the event that a leak develops around the stem.

It is also an object of the present invention to provide such a lockdown screw having a stem which may be easily actuated both into and out of the housing or head during service without the need to back off the gland nut first, thereby eliminating the possibility that an operator will forget to retighten a gland nut after loosening it to actuate the lockdown screw stem.

It is a further object of the present invention to provide effective metal-to-metal seals between the gland nut and the stem and between the gland nut and the housing or head which may be actuated in the event of a leak developing at the lockdown screw during service, providing a positive, reliable and secure means for stopping the leak without shutting in the well or otherwise interrupting service. It is an additional object of the present invention to provide such a lockdown screw with a metal-to-metal seal around the stem between the stem and the nose of the gland nut, and a metal-to-metal seal around the exterior of the gland nut between the gland nut and the housing or head, which may be quickly and easily actuated in the event that a leak in the lockdown screw is not stopped by actuation of the metal-to-metal backseat seal.

It is a further object of the present invention to provide a lockdown screw wherein the sole working thread is isolated by the packing from well fluids, eliminating the risk of damage to the working thread from such well fluids. It is an additional object of the present invention to provide means for easy removal of the packing from the housing or head when the lockdown screw is removed. It is another object of the present invention to provide such a lockdown screw which is relatively simple, easy to manufacture and install, inexpensive, and reliable.

SUMMARY OF THE INVENTION

The present invention accomplishes the objectives set forth above by providing a lockdown screw having a gland nut adapted for threaded installation into a lockdown screw receiving bore in a housing or head. The receiving bore is threaded only part way into the housing or head, only far enough to accommodate the threads on the gland nut. A stem is threaded into the gland nut for reciprocation into or out of the head through clockwise or counterclockwise rotation, as the case may be, of the stem. The thread in the gland nut and on the stem is the sole working thread for the lockdown screw. A self-energizing packing is disposed around the stem for forming a fluid-tight seal between the wall of the receiving bore and the stem. The gland nut is threaded into the receiving bore until it engages an inner seat in the receiving bore, and is snugged up against the outer end of the packing without substantially preloading the packing in an axial direction. The packing is energized by squeezing it in a radial direction upon installation, generating a sealing force against the bore and the stem without the necessity of applying an axial force on the packing. The packing may also be further energized by application of fluid pressure from the main bore of the housing or head.

The annular inner seat in the receiving bore engages a correlatively shaped annular surface around the exterior periphery of the gland nut at its inner end, resulting in zero extrusion gap between the gland nut and the wall of the receiving bore when the gland nut is snugged up against the inner seat.

There is an annular backseat shoulder on the stem adjacent and inwardly of the inner end of its threaded portion, and a correlatively shaped annular backseat in the gland nut around the stem outwardly of the backseat shoulder. Under normal operating conditions, with the stem in its inwardly actuated position such that its inner end is operatively engaged with the hanger, packoff, or other apparatus disposed in the housing or head, the annular backseat shoulder on the stem is spaced from the annular backseat in the gland nut. In the event of a leak occurring at the lockdown screw in question, the stem can be backed out of the head until the annular backseat shoulder engages the backseat, forming a metal-to-metal backseat seal for the stem. This removes the lockdown screw in question from service, but under normal circumstances there will be a sufficient number of lockdown screws remaining in service so as not to adversely affect their cumulative performance. The stem can be backed out of the head in order to remove the nose of the lockdown screw from service without actuating the backseat seal, if desired.

In the event that the metal-to-metal backseat seal does not stop the leak, the lockdown screw of the present invention has additional means for creating metal-to-metal seals around the stem between the stem and the gland nut, and around the gland nut between the gland nut and the housing or head, which will effectively stop any leak which is not stopped by the metal-to-metal backseat seal. There is an annular outer shoulder around the exterior periphery of the gland nut toward its outer end, and a correlatively shaped annular outer seat in the housing or head around the outer end of the receiving bore. Under normal circumstances, with the gland nut engaged against the inner seat and snugged up against the packing, there is a small gap between the outer shoulder on the gland nut and the outer seat in the housing or head. In the event of a leak which cannot be stopped by actuating the backseat seal, the gland nut is torqued down tightly, for example with a cheater bar or the like, until the outer shoulder on its exterior periphery engages the outer seat in the housing or head, forming a metal-to-metal seal around the gland nut between the gland nut and housing or head.

When the gland nut is torqued down tightly as referred to above, the annular inner seat in the receiving bore, which is already engaged with the exterior periphery of the gland nut on its inner end prior to such torquing so as to form the zero extrusion gap referred to above, forces the gland nut to bite into the stem around its exterior periphery, forming a metal-to-metal seal around the stem between the stem and the gland nut.

The working threads in the gland nut and on the stem are isolated from well fluids by the stem packing. Thus, the risk of damage to the working threads from dirt, oil, mud, well trash and the like is eliminated.

There is an annular step shoulder on the stem, disposed inwardly of the stem packing, which carries the stem packing out of the receiving bore when the lockdown screw is removed. Thus, changing the stem packing is greatly simplified.

BRIEF DESCRIPTION OF THE DRAWINGS

The above-described features and advantages of the present invention will be apparent from the following detailed description, read in conjunction with reference to the following drawing wherein.

DETAILED DESCRIPTION OF THE PREFERRED EMBODIMENT OF THE INVENTION

Figure 1:
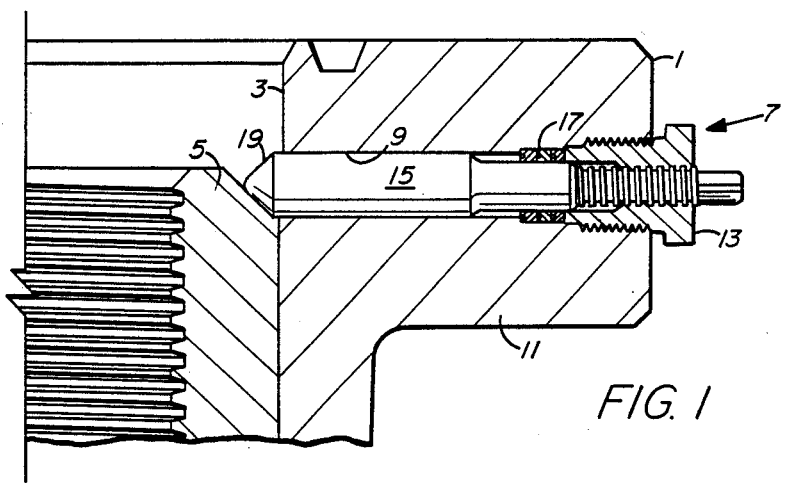
FIG. 1 is a fragmentary, vertical cross-sectional view of a portion of a casing or tubing hanger disposed within a casing or tubing head of an oil or gas well and incorporating a lookdown screw of the present invention, the lockdown screw being shown in service under normal operating conditions with the annular backseat shoulder on the stem being spaced from the annular backseat in the gland nut.

Referring now to FIG. 1, there is shown in vertical cross-section a portion of an annular member 1, which may be, for example, a casing or tubing head of an oil or gas well, in the bore 3 of which is disposed a second member 5, which may be, for example, a casing or tubing hanger. A lockdown screw according to the present invention, indicated generally at 7, is shown disposed in a radially extending bore 9 in outwardly protruding portion 11 of member 1. Outwardly protruding portion 11 may be an annular flange or portion thereof, for example, or a cylindrical boss or the like. Typically, lockdown screw 7 will be one of a plurality of such lockdown screws circumferentially spaced apart around the exterior periphery of member 1. Lockdown screw 7 includes a gland nut 13 threaded into the radially outermost end of bore 9, a stem 15 threaded into gland nut 13 for reciprocation in bore 9 into or out of bore 3 when the stem is rotated clockwise or counterclockwise, as the case may be, and a packing 17 disposed in an annular space around stem 15 for sealing between the wall of bore 9 and the stem when the packing is energized. When stem 15 is in its radially inner position, i.e, when lockdown screw 7 is in service, its inner end 19 extends into bore 3 and engages member 5. Inner end 19 of stem 15 may be provided with a frustoconical surface which engages a correlatively shaped surface on the upper outer periphery of the member 5, so that when the stem 15 moves radially inwardly and engages member 5, it will cam member 5 downwardly. Member 5 is prevented from moving upwardly with respect to the member 1 by engagement with the end 19 of stem 15. The downwardly directed camming action of the end 19 of stem 15 on member 5 may be used to energize a seal assembly or the like (not shown) between the members 1, 5, as is well known in the art. It should be understood that members 1, 5 may be any apparatus for which it is desired to hold down member 5 within member 1, and/or to actuate a seal assembly or the like between members 1, 5, or to otherwise utilize the camming action of lockdown screw stem 15 to actuate a mechanism of some sort. It is convenient, however, to describe the invention in connection with casing or tubing heads and hangers of an oil or gas well, since it is in that environment that the present invention has particular utility. Accordingly, member 1 will be referred to hereinafter as head 1, and member 5 will be referred to as hanger 5.

Figure 2:
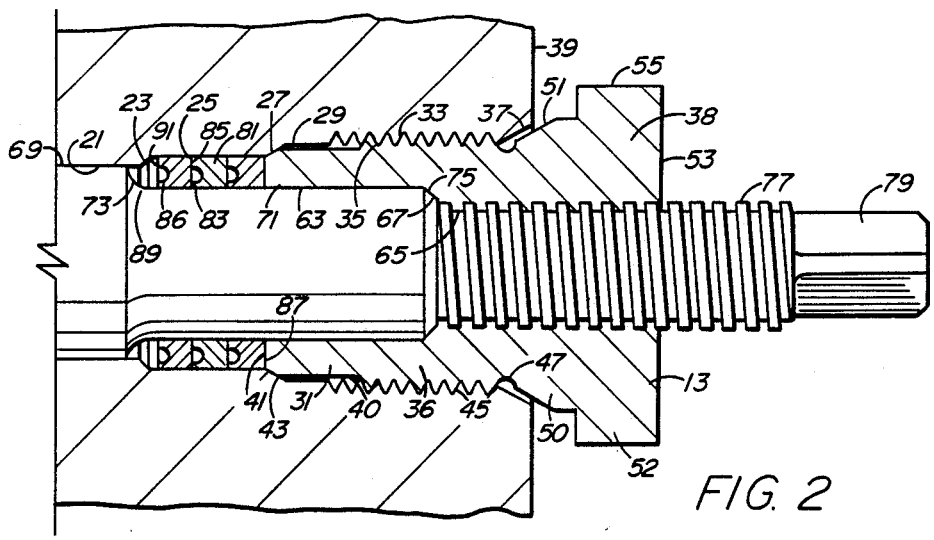
FIG. 2 is an enlarged, fragmentary cross-sectional view of part of the lockdown screw of the present invention shown in FIG. 1, showing the stem of the lockdown screw having been backed out of engagement and the metal-to-metal backseat seal actuated.

Referring now to FIG. 2, bore 9 of head 1 includes an inner portion 21 of substantially constant diameter which extends from bore 3 to an annular, frustoconical-shaped step shoulder 23. From step shoulder 23, bore 9 widens into an increased diameter packing receiving bore portion 25. Packing receiving bore portion 25 is of substantially constant diameter and extends from annular step shoulder 23 to an annular, frustoconical-shaped inner seat 27, where bore 9 widens into a second increased diameter bore portion 29 for receiving the nose 31 of gland nut 13. Inner seat 27 comprises a substantially smooth seating and sealing surface. Both step shoulder 23 and inner seat 27 face radially outwardly with respect to head 1 and radially inwardly with respect to the longitudinal axis of bore 9, and taper radially inwardly with respect to both head 1 and such longitudinal axis of bore 9. The second increased diameter bore portion 29 has a substantially constant diameter and extends from inner seat 27 to a threaded box portion 33 of bore 9. Threaded box portion 33 of bore 9 is of substantially constant diameter and has an internal screw thread for receiving the external screw thread 35 on the gland nut 13. Threaded box portion 33 extends from the radially outer end of the second increased diameter bore portion 29 to an annular, frustoconical-shaped outer seat 37, which in turn extends to the exterior side surface 39 of protruding portion 11 of head 1. As in the case of both step shoulder 23 and inner seat 27, outer seat 37 faces outwardly with respect to head 1 and inwardly with respect to the longitudinal axis of bore 9, and tapers inwardly with respect to both head 1 and such axis of bore 9. Outer seat 37 comprises a substantially smooth seating and sealing surface, as in the case of inner seat 27.

Gland nut 13 is an integral member which includes an elongate shank 36 adapted for insertion into bore 9, and a head 38 adapted for grasping by a wrench or other tool for installing and removing gland nut 13, and actuating certain of the metal-to-metal seals, as described in greater detail below. Shank 36 includes a substantially circular cylindrical nose portion 31 on its inner end, the nose portion having an exterior side wall surface 40 of substantially constant outside diameter and terminating in a flat end face 41. A frustoconical-shaped surface 43 extends between end face 41 and side wall surface 40 of nose portion 31. Frustoconical-shaped surface 43 is shaped correlatively to inner seat 27, and like inner seat 27, comprises a substantially smooth seating and sealing surface. Shank 36 also includes a threaded pin portion 45 which extends from the outer end of nose portion 31 to an annular, radius-profiled groove 47 disposed around the gland nut 13. Threaded pin portion 45 includes exterior threads 35 for screwing gland nut 13 into box 33.

Head 38 of gland nut 13 includes an inner annular portion 50 adjacent to the radius-profiled groove 47 at the outer end of shank 36, and an outer portion 52 terminating in an end face 53. Inner annular portion 50 of head 38 includes an annular, frustoconical-shaped outer shoulder 51 around its exterior periphery. Outer shoulder 51 faces radially inwardly with respect to head 1, and radially outwardly with respect to the longitudinal axis of gland nut 13. Outer shoulder 51 tapers radially inwardly with respect to both head 1 and such longitudinal axis of gland nut 13. Outer shoulder 51 is shaped correlatively to outer seat 37 in head 1, and like outer seat 37, comprises a substantially smooth seating and sealing surface. Outer portion 52 of gland nut head 38 includes flats 55 or other means which may be grasped by a wrench or other tool (not shown) for rotating the gland nut for its installation or removal, and for actuation of certain of the metal-to-metal seals.

Gland nut 13 includes a longitudinally axially extending bore 61 having an inner, smooth-walled portion 63 of substantially constant diameter which extends from end face 41 part way along the length of shank 36, and an outer, reduced diameter threaded portion 65 which extends from smooth-walled portion 63 through the end face 53 of gland nut 13. Between smooth-walled portion 63 and threaded portion 65 of bore 61, there is disposed an annular, frustoconical-shaped backseat 67. Backseat 67 comprises a substantially smooth seating and sealing surface, facing radially inwardly with respect to both head 1 and the longitudinal axis of gland nut 13, and tapering radially outwardly with respect to head 1 and radially inwardly with respect to such axis of gland nut 13. Threaded portion 65 of bore 61 preferably comprises Acme-type threads or the like, adapted for threaded engagement with correlatively shaped threads on stem 15.

Stem 15 comprises a substantially circular cylindrical, solid metal member having an inner, smooth-walled portion 69 of substantially the same outside diameter as the diameter of inner portion 21 of bore 9. Stem portion 69 is adapted for sliding, reciprocating movement within bore portion 21 as stem 15 is rotated clockwise and counterclockwise within gland nut 13. The inner end of stem portion 69 comprises camming end surface 19, described above. Stem 15 includes a reduced diameter sealing portion 71 disposed outwardly of the inner, smooth-walled portion 69, forming an arcuate step shoulder 73 between stem portions 69, 71. Reduced diameter sealing portion 71 is smooth-walled and has substantially the same outside diameter as the diameter of bore portion 63 of bore 61. Sealing portion 71 of stem 15 is adapted for sliding, reciprocating movement within bore portion 63 as stem 15 is rotated clockwise and counterclockwise within gland nut 13. Sealing portion 71 is also adapted for sealing engagement with packing 17, as is packing receiving bore portion 25 of bore 9.

At the outer end of reduced diameter sealing portion 71, stem 15 includes an annular, frustoconical-shaped backseat shoulder 75 which is shaped correlatively to annular backseat 67. Backseat shoulder 75 comprises a substantially smooth seating and sealing surface which is adapted for forming a metal-to-metal backseat seal against backseat 67 when stem 15 is backed out of gland nut 13 as described in further detail below. Backseat shoulder 75 faces radially outwardly with respect to head 1 and stem 15, and tapers radially outwardly with respect to head 1 and radially inwardly with respect to stem 15. Stem 15 includes a reduced diameter threaded portion 77 disposed outwardly of annular backseat shoulder 75 and having threads thereon which are shaped correlatively to the threads of threaded portion 65 of bore 61, so that stem 15 may be reciprocated within gland nut 13 by rotation of the stem about its longitudinal axis. As set forth previously, the threads on stem 15 and in gland nut 13 are preferably Acme-type threads. Stem 15 includes flats 79 or other means on its outer end for engagement by a wrench or other tool (not shown) for rotating the stem within the gland nut.

Packing 17 is disposed in the annular space between stem portion 71 and bore portion 25 and is adapted for forming a self-energizing seal between the stem and the bore. Packing 17 preferably includes a plurality of annular seal members 81 stacked together, each seal member 81 itself being adapted for forming a self-energizing seal against the stem and bore wall. The seal members 81 each comprise a body of substantially rectangular cross-section, preferably with an annular, arcuate-profiled groove 83 disposed substantially in the middle of its inner side face. Seal members 81 in their unstressed state have an outer diameter larger than the diameter of bore portion 25, and an inner diameter smaller than the outer diameter of stem portion 71. Thus, seal members 81 are squeezed in a radial direction when installed in the annular space between the bore wall and the stem, so as to effectively seal against the bore wall and stem upon installation of the lockdown screw 7 in the head 1. Seal members 81 are thus self-energizing. Seal members 81 are preferably formed of a material having sufficient resiliency such that when seal members 81 are exposed to fluid pressure from within head 1, the lips 85 on the radially outer side of grooves B3 are forced by the fluid pressure to expand into tighter sealing engagement with the bore portion 25, and the lips 86 on the radially inner side of grooves 83 are forced to expand into tighter sealing engagement with the stem portion 71. Due to this additional self-energizing effect, the greater the pressure in head 1 to which seal members 81 are exposed, the greater will be the sealing force of lips 85, 86 against the bore wall and stem, respectively. It should be understood that seal members 81 need not have an annular groove 83 in their inner faces, so long as the seal members have sufficient elastic "memory" in a radial direction to maintain a proper seal energizing force against the bore wall and stem in service, without the necessity of axial compression of the seal members.

When gland nut 13 is installed in head 1, there is little or no preloading of the packing 17 in an axial direction, since the gland nut is initially screwed into bore 9 only until surface 43 snugs up against inner seat 27. The flat end face 41 of gland nut 13 abuts the outer end face 87 of the outermost seal member 81, but there is an annular space 89 between the inner end face 91 of the innermost seal member 81 and the step shoulder 23. In addition, there will be a small space between the outer seat 37 and the outer shoulder 51. It is preferred that the spacing between seat 37 and shoulder 51 under normal operating conditions be about 0.030 inches, but other spacings could be used. The gland nut 13 will remain in this initially-installed position, shown in FIG. 2, under normal operating conditions. Since there is little or no preloading of the packing 17 in an axial direction, care must be taken in selecting the dimensions and material for seal members 81 so that an effective seal will be formed, due to radial squeeze only and not dependent on axial squeeze, at both high and low pressures in head 1. Seal members 81 preferably comprise a natural or synthetic rubber or other elastomeric material, or a filled fluoroplastic material such as filled Teflon or the like, but other materials such as another suitable plastics material or a suitable metal could be used.

It is preferred that the gland nut 13 of the present invention be made of a metal such as 4130 steel or the like, but other materials could be used. For the stem 15, it is preferred that a metal such as 4140 steel be used for regular service, and for severe conditions it is preferred that higher alloys such as monels or inconels be used. Again, however, many other materials will no doubt be suitable.

The lockdown screw 7 of the present invention is assembled into a unit prior to installation in head 1. Packing 17 is installed on stem portion 71, and the stem 15 is then screwed into gland nut 13. Gland nut 13 is then screwed into threaded box 33 until frustoconical portion 43 engages inner seat 27, forming zero extrusion gap to prevent extrusion of any of the seal members 81 outwardly past inner seat 27. The inner end face 41 of gland nut 13 will be snugged up against the outer end face 87 of the outermost seal member 81. Stem 15 can then be operated in gland nut 13 by grasping flats 79 with a wrench or other tool and rotating the stem clockwise or counterclockwise to advance or withdraw the stem into or out of the gland nut.

Since the packing 17 is self-actuating and not substantially preloaded in an axial direction by the gland nut 13, and also not subject to increased torquing of the gland nut in an attempt to stop leaks, the stem of the present invention should be easier to operate in the gland nut than stems of lockdown screws used in the past. The Acme-type threads should also facilitate stem actuation. Moreover, the gland nut of the present invention will not have to be loosened in order to back out the stem, thereby eliminating the problem of inadvertent failure to re-tighten gland nuts when lockdown screw stems of the past were to be backed out. It will also be appreciated that since the stem packing 17 is disposed between the well fluids and the working threads 65, 77, under normal circumstances the working threads of the present invention will be isolated from dirt, oil, mud, trash, or corrosive fluids from the wellbore. This will substantially reduce the possibility that the lockdown screw of the present invention will be damaged by exposure to such agents in service.

Under normal circumstances, the lockdown screw stem 15 will be in the position illustrated in FIG. 1 when in service. The backseat shoulder 75 will be spaced from the backseat 67, and the end 19 of stem 15 will be in engagement with the upper end of hanger 5. If it is desired to remove the lockdown screw 7 from service for some reason, stem 15 is backed out of gland nut 13 until end 19 clears hanger 5. As stated above, gland nut 13 will not have to be loosened in order to back out the stem 15.

In the event that the lockdown screw 7 of the present invention begins to leak around the stem, the stem 15 is backed out of gland nut 13 until backseat shoulder 75 engages backseat 67, and torqued sufficiently to create a metal-to-metal backseat seal for the stem. In many cases, the creation of such a backseat seal at 67, 75 will be sufficient to stop leakage past the stem.

Figure 3:
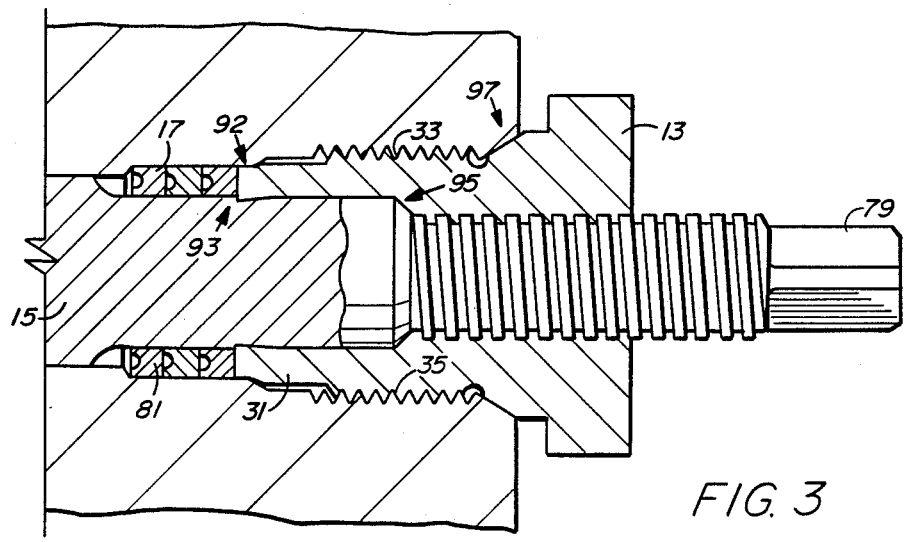
FIG. 3 is a view similar to FIG. 2, showing the gland nut having been torqued down to actuate the metal-to-metal seals at the gland nut nose, between the gland nut and the stem, and at the annular outer seat in the head, between the gland nut and the head.

If the leak persists in spite of creation of the metal-to-metal backseat seal, then a cheater bar or the like can be used to torque down on the gland nut 13 to drive it radially inwardly a sufficient distance to actuate additional metal-to-metal seals. Such torquing will force the frustoconical surface 43 of the gland nut nose 31 more tightly into engagement with the inner seat 27, and will cam the gland nut nose 31 into tighter engagement with the stem portion 71. When sufficient torque has been applied to the gland nut 13 through flats 55, the inner portion of the gland nut nose 31 will bite into the surface of the stem portion 71, forming a metal-to-metal seal, shown at 93, around the stem between the stem and the gland nut. The surface 43 will also be forced into tighter, metal-to-metal sealing engagement with the inner seat 27. In addition, the outer shoulder 51 will be forced into metal-to-metal sealing engagement with the outer seat 37. The metal-to-metal backseat seal will remain actuated when the gland nut is "overtorqued" to create the additional metal-to-metal seals at the inner and outer ends of the gland nut. Accordingly, the lockdown screw 7 of the present invention will be rendered substantially leakproof by positive, substantially impenetrable metal-to-metal seals around the gland nut nose between the gland nut and head 1 and between the gland nut and stem 15; around the backseat seal, between the stem and gland nut; and around the exterior of the gland nut between the gland nut and the head 1. The fully actuated metal-to-metal seals are illustrated in FIG. 3 at 92, 93, 95 and 97, respectively. With the lockdown screw 7 of the present invention disposed as shown in FIG. 3, all leaks should be stopped. Moreover, the well will not have to be shut down, and no special packer or the like will have to be run in the well in order to isolate the lockdown screw, in order to stop the leak. It should be noted that with the lockdown screw in the position shown in FIG. 3, the stem 15 is removed from service. That is also the case for the position shown in FIG. 2. As noted above, however, there will typically be a plurality of such lockdown screws disposed about the circumference of the head, so that the lockdown screws remaining in service should be able to carry the load required of them.

In the event that the working threads 65, 77 of the present invention become stripped or otherwise damaged, the gland nut 13 is loosened and removed, pulling the stem 15 and packing 17 with it. The entire lockdown screw assembly can be replaced if desired or required. Since the working threads are disposed in the gland nut and on the stem instead of in a deep flange bore, repairs to the working threads are possible without the need for costly and time-consuming well shutdowns or off-site repairs. The need for plugging, welding, or reboring of a damaged, deep flange bore thread is thus eliminated. Moreover, in the event that replacement of the packing is all that is required to recondition the lockdown screw, removal of the packing is simplified because the packing comes out with the stem 15 when it is pulled out of bore 9, being forced out by the step shoulder 73.

It should be noted that it is not necessary to torque down the gland nut heavily under normal operating conditions. Therefore, the likelihood of causing damage to the threads 33 under normal circumstances is not great. It is also contemplated that sufficient torque can be applied to the gland nut to actuate the metal-to-metal seals 92, 93 and 97 without damaging the threads 33 or 35.

While preferred embodiments of the invention have been shown and described, many modifications thereof may be made by those skilled in the art without departing from the spirit of the invention. Therefore, the scope of the invention should be determined in accordance with the following claims.

I claim:

1. A lockdown screw for holding down a first member within a main bore of a second member, the second member having a radial bore communicating with the main bore, comprising:
   a gland nut threadedly insertable within the radial bore, the gland nut having an outer end face and a central axial bore therein, the central axial bore having a threaded portion extending inwardly from the outer end face of said gland nut part way through said gland nut;
   a stem threadedly received in said threaded portion of said central axial bore for reciprocation into and out of said gland nut when said stem is rotated, the inner end of said stem projecting into said main bore and having means engageable with the first member for preventing axial movement of the first member with respect to the second member when the lockdown screw is in service;
   packing means disposed between said stem and said radial bore for sealingly engaging the outer surface of said stem and the wall of said radial bore;
   an annular backseat disposed in said central axial bore of said gland nut inwardly of said threaded portion; and
   an annular backseat shoulder disposed on said stem and engageable with said annular backseat of said gland nut for forming a metal-to-metal backseat seal when said stem is backed sufficiently out of said gland nut.

2. A lockdown screw according to claim 1, wherein said packing means is disposed between the main bore of the second member and the threaded connection between said gland nut and said stem.

3. A lockdown screw according to claim 1, wherein said gland nut includes an inner end face, and said packing means includes a self-energizing seal member disposed inwardly of said inner end face of said gland nut for sealingly engaging the outer surface of said stem and the wall of said radial bore upon insertion of said seal member between said stem surface and said bore wall.

4. A lockdown screw according to claim 3, wherein said seal member is not substantially preloaded in an axial direction.

5. A lockdown screw according to claim 3, wherein said seal member includes an annular groove in its inner end face forming an outer lip between said groove and said bore wall and an inner lip between said groove and said stem surface.

6. A lockdown screw according to claim 5, wherein said packing means includes a plurality of said seal members stacked together.

7. A lockdown screw according to claim 2, wherein said stem includes an annular step shoulder disposed between said packing means and said main bore for engaging said packing means and carrying said packing means out of said radial bore when said lockdown screw is removed therefrom.

8. A lockdown screw according to claim 2, wherein the radial bore includes an annular inner seat and said packing means is disposed inwardly of said inner seat toward the main bore of the second member, said gland nut including an inner end face having an annular frustoconical surface around its outer periphery in engagement with said inner seat forming zero extrusion gap for said packing means when said gland nut is snugged up in the threaded portion of the radial bore under normal operating conditions.

9. A lockdown screw according to claim 8, wherein the diameter of said stem is substantially equal to the diameter of said central axial bore of said gland nut at said inner end face of said gland nut, the second member includes an annular outer seat around the outer end of the radial bore, and said gland nut includes an annular outer shoulder adjacent and closely spaced from the outer seat when the gland nut is snugged up in the threaded portion of the radial bore under normal operating conditions, and wherein said inner seat cams said frustoconical surface of said gland nut inwardly with respect to said stem, forcing the portion of said gland nut around said central axial bore at said inner end face of said gland nut to bite into said stem and form a metal-to-metal seal between the stem and the gland nut, and said outer shoulder of said gland nut sealingly engages said outer seat and forms a metal-to-metal seal, when said gland nut is overtorqued from said snugged up position.

10. A lockdown screw according to claim 9, wherein said frustoconical surface of said gland nut is forced into tighter metal-to-metal sealing engagement with said inner seat when said gland nut is overtorqued from said snugged up position.

11. A lockdown screw for holding down a first member within a main bore of a second member, the second member having a transversely extending bore communicating with the main bore, comprising:
   a threaded box in an outer portion of the transversely extending bore, and a reduced diameter annular inner seat in the transversely extending bore inwardly of the threaded box;
   a gland nut having an inner end face, a frustoconical surface around the exterior periphery of said inner end face, and a central axial bore, and being threadedly received in said threaded box such that said frustoconical surface abuts against said inner seat under normal operating conditions;
   said central axial bore of said gland nut having an outer threaded portion, an inner increased diameter smooth-walled portion, and an annular backseat between said outer threaded portion and said inner smooth-walled portion;
   a stem having an outer threaded portion threadedly receivable in said outer threaded portion of said gland nut, an increased diameter smooth-walled intermediate portion inwardly of said outer threaded portion, and an annular backseat shoulder between said outer threaded portion and said intermediate smooth-walled portion of said stem;
   self-energizing packing means disposed around said stem inwardly of said inner end face of said gland nut for sealingly engaging said stem and the wall of said transversely extending bore when said lockdown screw is inserted into said transversely extending bore;
   said stem having an inner end surface which extends into the main bore of the second member and engages the first member, preventing axial movement in at least one direction of the first member with respect to the second member, when the lockdown screw is in service; and said annular backseat shoulder on said stem engaging said annular backseat in said gland nut, forming a metal-to-metal backseat seal, when said stem is backed sufficiently out of said gland nut.

12. A lockdown screw according to claim 11, and further including an annular outer seat around the transversely extending bore at its outer end and an annular outer shoulder around said gland nut spaced outwardly of and closely adjacent to said outer seat when said frustoconical surface of said gland nut abuts said inner seat under normal operating conditions, said inner seat camming said frustoconical surface of said gland nut inwardly, forcing said gland nut at said inner end thereof into metal-to-metal sealing engagement with said stem, and said outer annular shoulder being forced into metal-to-metal sealing engagement with said annular outer seat, when said gland nut is overtorqued from its normal operating position.

13. A lockdown screw according to claim 12, wherein said frustoconical surface of said gland nut is forced into tighter metal-to-metal sealing engagement with said inner seat when said gland nut is overtorqued from its normal operating position.

14. A lockdown screw according to claim 12, wherein said stem includes an increased diameter smooth-walled inner portion inwardly of said intermediate smooth-walled portion and an annular step shoulder between said intermediate and inner smooth-walled portions, said annular step shoulder engaging said packing means and carrying said packing means out of said transversely extending bore when said lockdown screw is removed therefrom.

15. A lockdown screw according to claim 11, wherein said packing means comprises a plurality of annular lip seal members stacked together.

* * * * *